US006993457B2

(12) United States Patent  (10) Patent No.: US 6,993,457 B2
Zajac et al.  (45) Date of Patent: Jan. 31, 2006

(54) FAILED COMPONENT SEARCH TECHNIQUE

(75) Inventors: Dale S. Zajac, Ortonville, MI (US); Todd E. Kerkstra, Waterford, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 231 days.

(21) Appl. No.: 10/738,601

(22) Filed: Dec. 17, 2003

(65) Prior Publication Data

US 2005/0075840 A1    Apr. 7, 2005

Related U.S. Application Data

(60) Provisional application No. 60/504,812, filed on Sep. 22, 2003.

(51) Int. Cl.
*G06F 19/00* (2006.01)
(52) U.S. Cl. .......................... 702/185; 702/81; 702/84; 705/1; 700/109; 700/110
(58) Field of Classification Search ..................... None
See application file for complete search history.

(56) References Cited

U.S. PATENT DOCUMENTS

| | | | | |
|---|---|---|---|---|
| 5,608,658 A | * | 3/1997 | Yao et al. .................... | 702/108 |
| 6,366,199 B1 | * | 4/2002 | Osborn et al. ............... | 340/438 |
| 6,577,971 B2 | * | 6/2003 | Aitken et al. ................. | 702/81 |
| 6,578,001 B1 | * | 6/2003 | Schramek ...................... | 705/1 |
| 6,691,064 B2 | * | 2/2004 | Vroman ....................... | 702/183 |
| 6,823,287 B2 | * | 11/2004 | Shafer et al. ................. | 702/183 |
| 6,922,656 B2 | * | 7/2005 | Butler et al. ................. | 702/183 |
| 2003/0014142 A1 | * | 1/2003 | Olle et al. ................... | 700/110 |
| 2003/0033170 A1 | * | 2/2003 | Bhatt et al. .................... | 705/4 |
| 2003/0101019 A1 | * | 5/2003 | Klausner et al. ............. | 702/182 |
| 2003/0135310 A1 | * | 7/2003 | Bangert et al. ................ | 701/29 |
| 2003/0171897 A1 | * | 9/2003 | Bieda et al. ................. | 702/185 |
| 2004/0133397 A1 | * | 7/2004 | Bjornson ..................... | 702/185 |
| 2004/0138771 A1 | * | 7/2004 | Mok et al. ..................... | 700/95 |
| 2004/0210334 A1 | * | 10/2004 | Tateishi et al. .............. | 700/106 |
| 2005/0055176 A1 | * | 3/2005 | Clarke et al. ................ | 702/182 |
| 2005/0065752 A1 | * | 3/2005 | Shafer et al. ................ | 702/183 |
| 2005/0071029 A1 | * | 3/2005 | Yamamoto et al. ........... | 700/97 |
| 2005/0113957 A1 | * | 5/2005 | Gallu et al. .................. | 700/110 |
| 2005/0131596 A1 | * | 6/2005 | Cherrington et al. ......... | 701/29 |
| 2005/0203758 A1 | * | 9/2005 | Blum et al. ..................... | 705/1 |

* cited by examiner

*Primary Examiner*—Patrick J. Assouad
(74) *Attorney, Agent, or Firm*—Thomas A. Jurecko

(57) ABSTRACT

A method for determining which component of a multi-component product is responsible for a problem with the product features dismantling first and second products—one exhibiting the problem and one not. One different component from each of the original two samples is then used in building a plurality of new products. The new products are then comparatively tested to determine which component or components caused the problem.

9 Claims, 3 Drawing Sheets

| | Sample # | Rod Ass'y | Oil Seal | Spring | Rod Guide | Check Valve | P. Tube Ass'y | Piston Valve Ass'y | R. Tube Ass'y | Cover Seal | Oil |
|---|---|---|---|---|---|---|---|---|---|---|---|
| | W1 | Warranty | New | New | New | New | New | New | | | |
| | W2 | New | Warranty | New | New | New | New | New | | | |
| | W3 | New | New | Warranty | New | New | New | New | | | |
| Worst | W4 | New | New | New | Warranty | New | New | New | | | |
| | W5 | New | New | New | New | Warranty | New | New | | | |
| | W6 | New | New | New | New | New | Warranty | New | | | |
| | W7 | New | New | New | New | New | New | Warranty | New | New | New |
| | B1 | Warranty | New | New | New | New | New | New | | | |
| | B2 | New | Warranty | New | New | New | New | New | | | |
| | B3 | New | New | Warranty | New | New | New | New | | | |
| Best | B4 | New | New | New | Warranty | New | New | New | | | |
| | B5 | New | New | New | New | Warranty | New | New | | | |
| | B6 | New | New | New | New | New | Warranty | New | | | |
| | B7 | New | New | New | New | New | New | Warranty | | | |

| Sample # | Rod Ass'y | Oil Seal | Spring | Rod Guide | Check Valve | P. Tube Ass'y | Piston Valve Ass'y | R. Tube Ass'y | Cover Seal | Oil |
|---|---|---|---|---|---|---|---|---|---|---|
| W1 | Warranty | New | New | New | New | New | New | | | |
| W2 | New | Warranty | New | New | New | New | New | | | |
| W3 | New | New | Warranty | New | New | New | New | | | |
| W4 | New | New | New | Warranty | New | New | New | | | |
| W5 | New | New | New | New | Warranty | New | New | | | |
| W6 | New | New | New | New | New | Warranty | New | | | |
| W7 | New | New | New | New | New | New | Warranty | New | | |
| B1 | Warranty | New | New | New | New | New | New | | | |
| B2 | New | Warranty | New | New | New | New | New | | | |
| B3 | New | New | Warranty | New | New | New | New | | | |
| B4 | New | New | New | Warranty | New | New | New | | | |
| B5 | New | New | New | New | Warranty | New | New | | New | |
| B6 | New | New | New | New | New | Warranty | New | | | |
| B7 | New | New | New | New | New | New | Warranty | | | New |

FIG-2

| Sample | Cycles Completed | Weepage Rating | Round 1 | | | Round 2 | | | Round 3 | | |
|---|---|---|---|---|---|---|---|---|---|---|---|
| | | | ROD TEMP | SEAL TEMP | TUBE TEMP | ROD TEMP | SEAL TEMP | TUBE TEMP | ROD TEMP | SEAL TEMP | TUBE TEMP |
| W1 | 300 | 2 (P) | 102 | 97 | 106 | 137 | 129 | 153 | 165 | 150 | 191 |
| W2 | 273 | 5 (F) | N/A | N/A | N/A | 125 | 136 | N/A | 140 | 170 | 180 |
| W3 | 300 | 0 (P) | 96 | 93 | 103 | 134 | 130 | 135 | 157 | 171 | 169 |
| W4 | 300 | 1 (P) | 93 | 101 | 105 | 117 | 122 | 126 | 143 | 154 | 166 |
| W5 | 300 | 1 (P) | 97 | 93 | 111 | 129 | 136 | 145 | 140 | 165 | 183 |
| W6 | 300 | 0 (P) | 103 | 100 | 110 | 127 | 128 | 158 | 177 | 161 | 190 |
| W7 | 300 | 3 (P) | 90 | 97 | 98 | 120 | 131 | 140 | 160 | 172 | 159 |
| B1 | 300 | 0 (P) | 99 | 99 | 110 | 134 | 141 | 139 | 164 | 183 | 177 |
| B2 | 200 | 4 (F) | 95 | 108 | 92 | 105 | 152 | 143 | N/A | N/A | N/A |
| B3 | 300 | 1 (P) | 91 | 95 | 98 | 119 | 137 | 145 | 146 | 172 | 187 |
| B4 | 300 | 0 (P) | 101 | 95 | 105 | 130 | 124 | 159 | 164 | 163 | 190 |
| B5 | 120 | 3 (F) | 95 | 102 | 108 | N/A | N/A | N/A | N/A | N/A | N/A |
| B6 | 300 | 1 (P) | 98 | 99 | 115 | 121 | 129 | 132 | 149 | 169 | 191 |
| B7 | 300 | 1 (P) | 99 | 103 | 89 | 129 | 132 | 125 | 130 | 168 | 152 |

*FIG-3*

FAILED COMPONENT SEARCH TECHNIQUE

RELATED APPLICATION(S)

This application claims the benefit of Provisional Patent Application Ser. No. 60/504,812, filed Sep. 22, 2003.

BACKGROUND OF THE INVENTION

The invention relates generally to product failure analysis. More specifically, the invention pertains to a failed component search technique where the original failed product containing a plurality of components must be at least partially destroyed in order to gain access to the plurality of components.

Known techniques for identifying a cause of a multi-component product failure involve component swapping. One such prior method begins by identifying two samples of the product being analyzed—one exhibiting the problem (a "worst" product) and one that does not exhibit the problem (a "best" product sample). The "worst" and the "best" product samples are then disassembled, and a first component is swapped between the two samples. The samples are reassembled and tested for the previously observed failure in the "worst" sample. If the "best" product sample now exhibits the previously observed problem, then the component at fault has been identified. If the "best" is still failure-free, then the samples are again disassembled and a different component is swapped. This process continues until the "best" sample exhibits the problem, to identify the component or components at fault.

This prior approach will not work, however, for products which are at least partially destroyed when disassembled. Such products typically employ non-mechanical fasteners such as welded seams or seals which are destroyed upon disassembly or dismantling.

SUMMARY OF THE INVENTION

A method for determining which of a plurality N of components in a product are responsible for an observed problem of the product begins by identifying a first sample of the product not exhibiting the observed problem. A second sample of the product is identified which exhibits the observed problem. The first product sample is dismantled to obtain N separate first sample components and the second sample is also dismantled to obtain another N separate second sample components. N new versions of the product are then produced each containing a different one of the N first sample components, and another N new versions of the product are produced each containing a different one of the N second sample components. Which of the N second sample components is a source of the observed problem is determined by comparative testing of the N new versions containing a different one of the N second sample components and the N new versions containing a different one of the N first sample components.

BRIEF DESCRIPTION OF THE DRAWING

The objects and features of the invention will become apparent from a reading of a detailed description, taken in conjunction with the drawing, in which:

FIG. 2 is a spreadsheet showing how new products incorporate one component from the "worst" and the "best" product samples pursuant to the invention; and FIG. 3 presents an example comparative test protocol with results for identifying a component causing a product failure in accordance with the principles of the invention.

DETAILED DESCRIPTION

Figure 1:
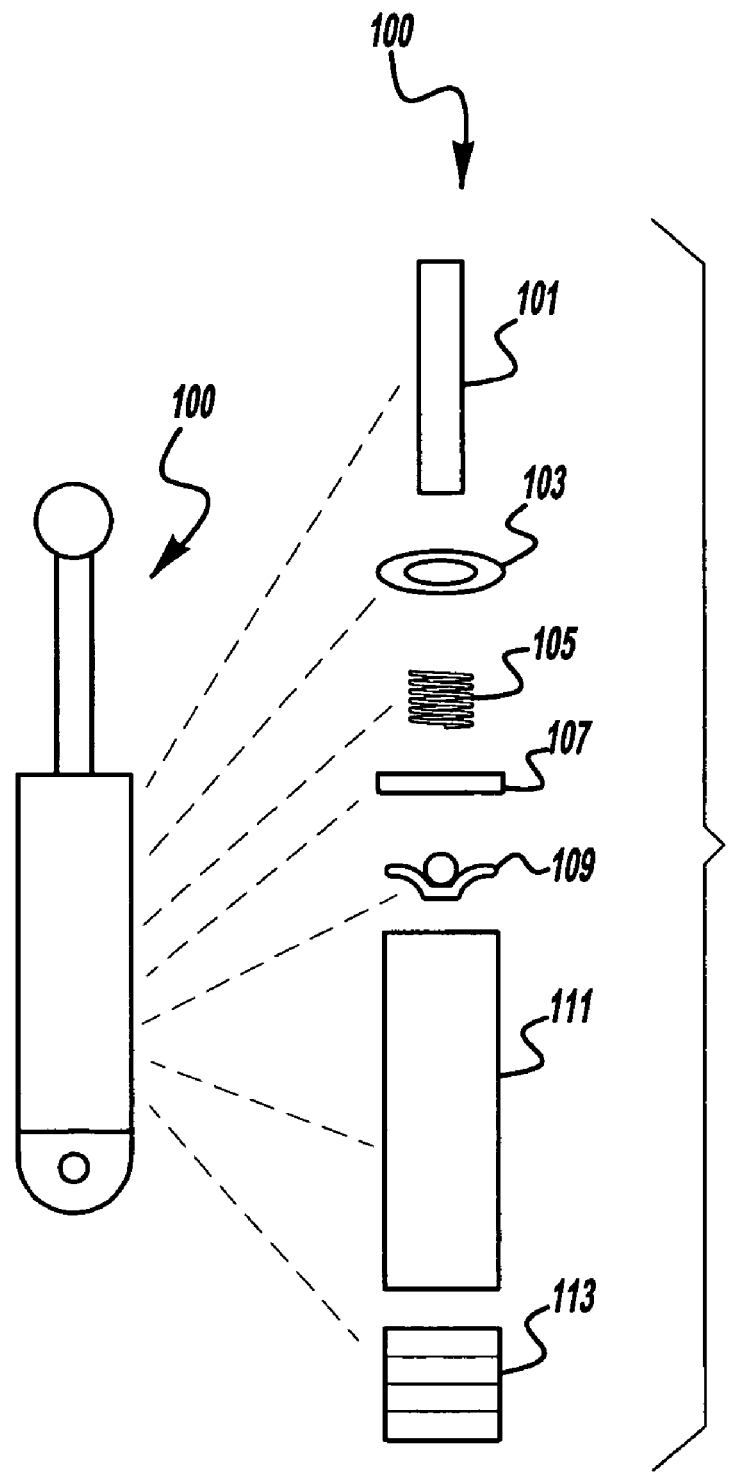
FIG. 1 is a combined perspective and exploded view of a vehicle shock absorber suitable for analysis in accordance with the principles of the invention.

An example of a product suitable for failure analysis in accordance with the invention is an automotive shock absorber. A typical shock absorber 100 is shown in FIG. 1. Shock absorber 100 typically has ten main components, seven of which are not destroyed when the shock absorber is dismantled. These seven components are rod assembly 101, oil seal 103, spring 105, rod guide 107, check valve 109, piston tube assembly 111 and piston valve assembly 113. The three components of shock absorber 100 which are at least partially destroyed when the shock absorber is dismantled are the rod tube assembly, a cover seal and the oil used in the shock absorber.

One type of problem with a typical vehicular shock absorber that is readily observable is "weepage". Weepage comprises leakage of internal shock absorber fluid (oil) to an outside surface of the shock absorber housing. Experience has shown that the seven components shown in the exploded view of FIG. 1 are the most likely causes of weepage.

Hence, the problem becomes where weepage is observed to be unacceptable, which of the seven components or combination thereof have caused the problem.

Prior component swapping techniques do not work with a vehicular shock absorber, because portions of the shock absorber are at least partially destroyed when dismantling a product sample exhibiting a weepage problem.

Hence, in accordance with the invention, a "worst" shock exhibiting unacceptable weepage is used along with an identically designed shock, preferably from the same vehicle, which does not exhibit the weepage problem in order to determine which component or components are at fault. The spreadsheet of FIG. 2 reflects the fact that in accordance with the invention, the "worst" product sample, in this case a shock absorber 100, is dismantled and the seven components shown in FIG. 1 are then used in producing seven new shock absorbers 200, containing the components of columns 204, 206, 208, 210, 212, 214 and 216. Likewise, the "best" shock absorber not exhibiting the problem is dismantled and its seven reusable components are distributed one at a time among seven new shock absorbers 202 to be built. Hence, 14 new shock absorbers are assembled where the "warranty" component comes from either the "worst" or the "best" original product samples which were dismantled. The distribution of the warranty parts for both the "worst" and "best" are set forth in the spreadsheet of FIG. 2.

As previously discussed, the rod tube assembly 218, the cover seal 220 and the oil 222 itself must be replaced with new components in the newly produced products for purposes of the failed component identification technique.

The next step in the analysis is to take the 14 new shock absorbers and to perform appropriate comparative testing among the various new products in an attempt to identify a component or components causing the weepage failure. FIG. 3 shows a protocol 300 for a series of cycling tests performed on the various shock absorbers for observing the degree of weepage with each product sample.

The seven samples 200 containing a component from the "worst" original sample W1–W7 and the seven new shock absorbers 202 assembled using components from the original "best" sample B1–B7 are subjected to three rounds of cycling tests 308, 310 and 312 wherein the temperature (in degrees Fahrenheit) of various key components along with a "weepage rating" are determined. In the protocol of FIG. 3, there were 100 cycles per round and a stroke of 75 mm, a rebound velocity of 1 mps, a compression velocity of 0.1 mps and a side load of 0 were employed as the parameters for each cycle.

The weepage rating is an indication of the observed amount of weepage over an outer surface area of the housing of the shock absorber and uses a rating scale of zero through five, zero being an indication of no weepage whatsoever while five is the "worst" case condition for weepage. A weepage rating indicates a shock absorber passes (P) if it is less than four, while a shock fails (F) with a weepage rating of four or higher.

As seen from FIG. 3, the samples are identified in column 302. The number of cycles completed for the three rounds was shown in column 304 and the weepage rating along with whether or not there was a pass (P) or failure (F) is indicated in column 306. As seen from FIG. 3, sample W2 at line 314 was the only sample having an unacceptable weepage rating of five. For the particular tests employed in this example, it will also be noted that sample B2 at line 316 and B5 at line 318 were indicated to have failed, even though these samples were produced using only components from the original "best" sample. Sample B5 failed because it was determined that an internal defect did not allow it to perform properly, and therefore its test results were discarded. Sample B2 failed, because it was determined that, although it was constructed from components from the "best" original sample, the component at issue was causing a delayed failure that would have been observed in time when the first and second original samples from the vehicle were being initially examined. In other words, over time, both the offending components from sample W2 and sample B2 would have ultimately caused a weepage failure.

In any event, the tests of FIG. 3 do demonstrate that only sample W2 from the "worst" case grouping exhibited a failure. Hence, going back to FIG. 2, we note at column 206 that sample W2 was built using the original oil seal 103 from the "worst" original sample. Hence, the offending component was oil seal 103. Indeed, the result of all these tests demonstrates that, for this particular example, the oil seal would have failed in all cases given enough time. The actual detailed cause of the weepage would come from further analysis. The total cause could be due to a defect in the component itself, or in improper assembly of that component, or both.

Hence, the technique of the invention may be summarized as follows. First, one takes two identically designed products, in the case of vehicular components preferably from the same vehicle, one of the two samples exhibiting the problem of interest and one not. The two samples should have similar use histories.

Next, one picks from prior experience those N (an integer) components of the disassembled "worst" product that could possibly be the cause of the exhibited problem. Then a second N components are taken from the "best" case sample exhibiting no problem. The dismantled components are then distributed over 2N units, with one of the N components placed in each newly manufactured product.

Finally, each of the 2N products are tested to determine which of the components from the "worst" case original sample product were causing the problem or failure.

The invention has been described with reference to an exemplary embodiment. The scope and spirit of the invention are to be determined from appropriately interpreted claims.

What is claimed is:

1. A method for determining which of a plurality N of components in a product are responsible for an observed problem of the product, the method comprising:

identifying a first sample of the product not exhibiting the observed problem;
identifying a second sample of the product exhibiting the observed problem;
dismantling the first sample to obtain N separate first sample components;
dismantling the second sample to obtain N separate second sample components;
producing N new versions of the product, each containing a different one of the N first sample components;
producing N new versions of the product, each containing a different one of the N second sample components; and
determining which of the N second sample components is a source of the observed problem by comparative testing of the N new versions containing a different one of the N second sample components and the N new versions containing a different one of the N first sample components.

2. The method of claim 1 wherein the first and second samples of the product have substantially identical use histories.

3. The method of claim 1 wherein the product cannot be reassembled after dismantling without using at least one new component.

4. The method of claim 1 wherein the product includes more than N components, and the N components are selected based upon whether each of the N components could cause the observed problem.

5. A method for determining which of a plurality of N sub-components of an automotive vehicle component are responsible for an observed problem of the vehicle component, the method comprising:

identifying a first vehicle component exhibiting the observed problem;
identifying a second identical vehicle component not exhibiting the observed problem, but having a usage history substantially identical to that of the first vehicle component;
dismantling the first and second vehicle components to obtain respective first and second sets of N sub-components;
producing a first group of N new components, each containing a different one of the first set of N sub-components;
producing a second group of N new components, each containing a different one of the second set of N sub-components; and
determining which of the first set of N sub-components is a source of the observed problem by comparative testing of the new components of the first and second groups.

6. The method of claim 5 wherein the first and second vehicle components are taken from the same vehicle.

7. The method of claim 6 wherein the first and second vehicle components cannot be dismantled without destroying at least one portion thereof.

8. The method of claim 7 wherein the first and second vehicle components comprise shock absorbers.

9. The method of claim 8 wherein the N sub-components comprise:

a rod assembly, an oil seal, a spring, a rod guide, a check valve, a piston tube assembly and a piston valve assembly.

* * * * *